UNITED STATES PATENT OFFICE.

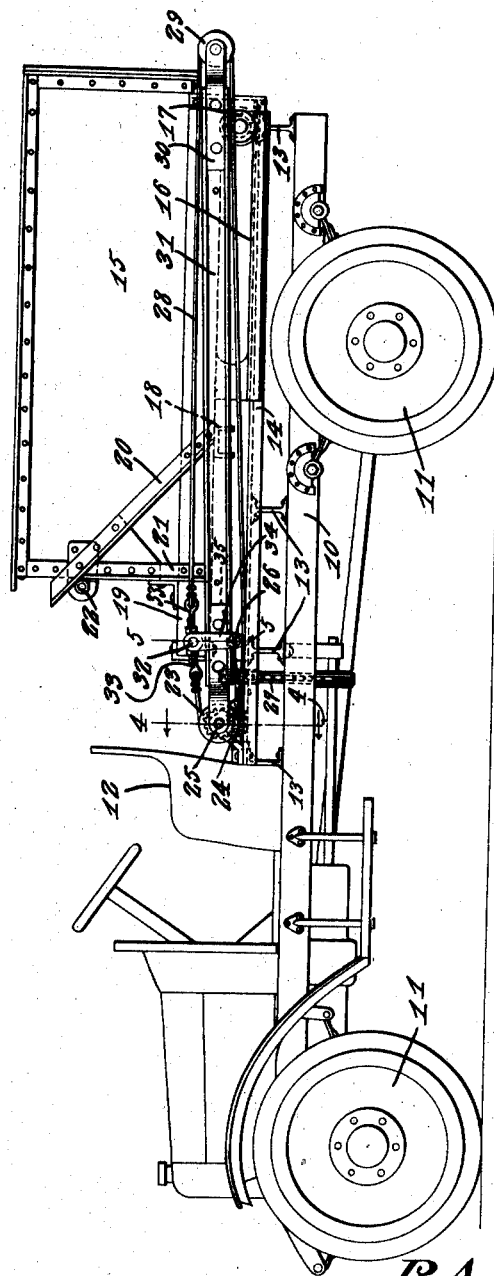

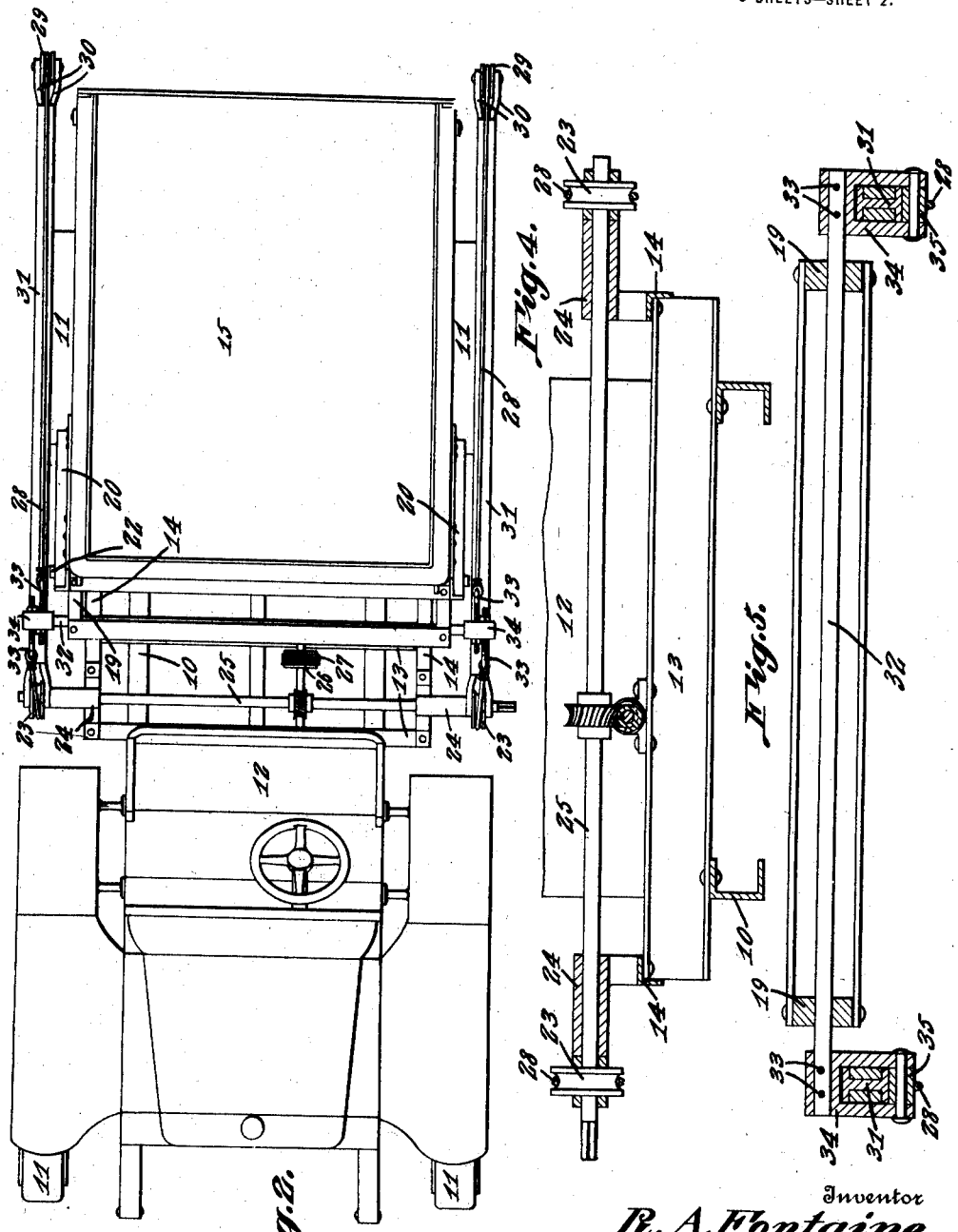

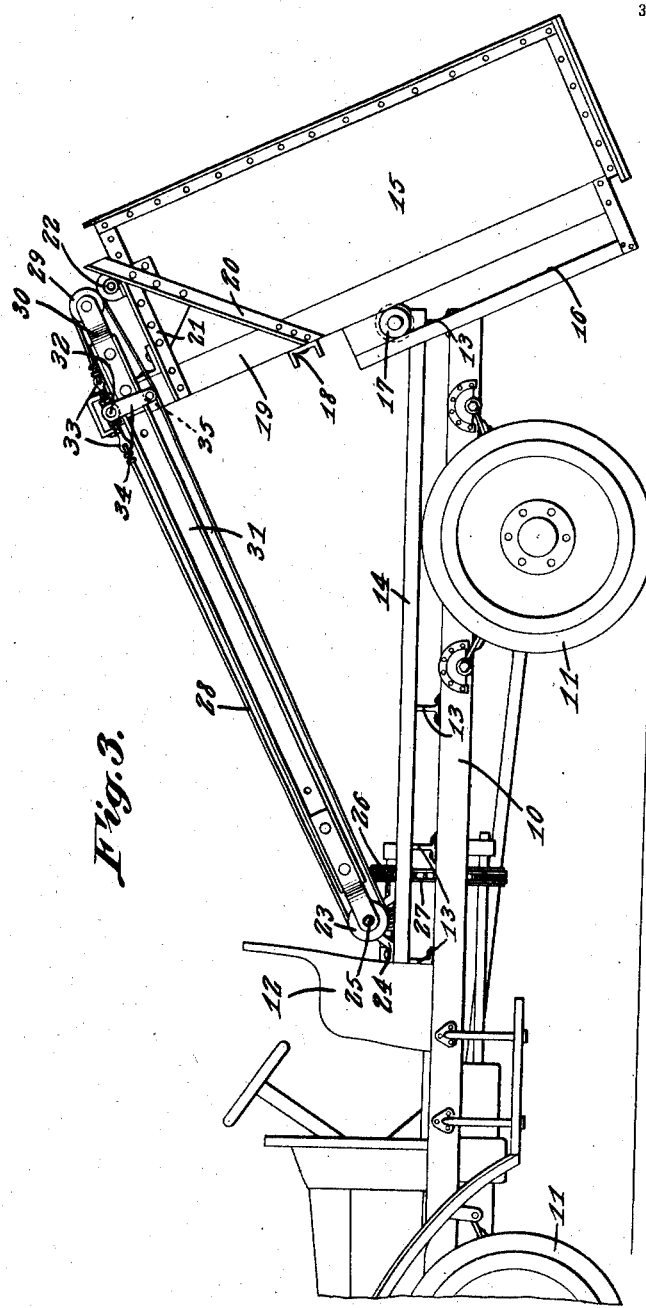

ROBERT A. FONTAINE, OF MARTINSVILLE, VIRGINIA.

DUMP-TRUCK.

1,396,738. Specification of Letters Patent. Patented Nov. 15, 1921.

Application filed January 17, 1920. Serial No. 352,025.

*To all whom it may concern:*

Be it known that I, ROBERT A. FONTAINE, a citizen of the United States, residing at Martinsville, in the county of Henry and State of Virginia, have invented a new and useful Dump-Truck, of which the following is a specification.

This invention relates to dump trucks, that is, motor trucks or vehicles of like character having a body mounted on the frame or chassis thereof and capable of being moved from a carrying to a dumping position at any desired angle rearwardly and downwardly inclined at the back of the truck, or from a dumping position to a carrying position.

The invention has reference more particularly to a modification and improvement for certain desired purposes, of and over the construction shown in my co-pending application, Serial No. 339638 and which is capable of use with dump bodies for hauling various granular material, or in connection with the demountable brick hacked body or loading and unloading attachment for vehicles as shown in my prior Patent No. 1,252,899 dated January 8, 1918, and the object of the invention is to provide a simple and strong actuating means for moving the body to a dumping or carrying position, which means may be power operated, that is, driven from the motor of the truck, or otherwise.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings:—

Figure 1 is a side elevation of my improved dump truck.

Fig. 2 is a plan view thereof.

Fig. 3 is a view similar to Fig. 1, but showing the device in a dumping position, and Fig. 4 is a vertical sectional view in rear of the seat of the truck and looking rearwardly.

Fig. 5 is a vertical sectional view in the rear of the seat of the truck, looking rearwardly and taken at a point to the rear of Fig. 4.

In my prior application before referred to, a dump truck is shown embodying the use of a single boom which is operable in connection with a cable for the purpose of moving the body of the truck to the carrying or dumping position, said boom being mounted intermediately of the sides of the chassis and movable beneath the body, in addition to the fact that the special skid and operating means for the boom and cable are employed so that the device can be operated by the chauffeur or driver without getting out of his seat. This type of boom and actuating means is preferably employed with dump bodies for carrying material other than bricks or like heavy loads whereas the device constituting the subject matter of the present invention is adaptable to such loads, although I do not restrict the application to any specific use.

As shown in the drawings, there is indicated a motor truck having a chassis or frame 10, carrying wheels 11 and a seat 12. Mounted upon the side rails or frame of the chassis are series of transverse beams 13 which are designed to support longitudinal run-way rails 14.

The body is designated at 15, being preferably of sheet metal and provided with all the necessary adjuncts such as a tail gate by which contents thereof may be discharged. In addition, the body is provided with slotted tracks 16 beneath the sides thereof and at the rear portions of the body so as to movably operate on rollers 17 rotatably journaled at each side of the rear portion of the chassis at the run-way rails, so that the body may be moved with ease to a dumping or to a carrying position.

The forward end of the body is reinforced by transverse bottom members 18 and longitudinal side members 19 near the bottom thereof, and which project forwardly of the body. Diagonal braces 20 extend from the rails 19 to the side portions of the body at the front of the latter, where the body is provided with vertical braces 21 and a transverse connected member 22 as used in the demountable bodies, the type of which is shown in my prior patent.

Mounted on the forward portion of the chassis in rear of the seat 12 is a pair of drums or grooved pulleys 23 having supports 24, the shaft 25 of the drums being suitably connected to a driving gear 26 having operative connection with the motor of the truck as through the medium of a chain 27 constituting a power take-off device so that the drum may be power operated, although it is here explained that the drum may be operated by hand, if desired. Arranged at the ends of the shaft and engaged around each drum or pulley 23 is an endless cable 28, said cables being trained around the drums or pulleys 23 and around smaller grooved pulleys 29 rotatably journaled in longitudinally adjustable extensions 30 at the free ends of the booms 31 similarly constructed at their inner ends and pivotally supported at the axis or shaft 25. Each cable is connected to a forward extension of the side members 19 as through the medium of a transverse pivot rod 32, eye bolts 33 or the like being employed for this purpose. This pivot rod carries at its ends, pivotal stirrups 34 which straddle the booms 31 and are provided with rollers 35 arranged to movably support the booms and carry the weight thereof.

It is to be understood that the booms are arranged at each side and are simultaneously operated so that when the cables are driven, the connections thereof with the body through the medium of the extensions of the longitudinal side members 19, will be raised and moved rearwardly or lowered and moved forwardly, the booms swinging in arcuate paths at the sides of the body and moving vertically into raised or lower positions, depending upon the position of the body at the time. During this movement, the rollers 35 will travel along the bottom edges of the booms, so that the cable will be permitted to freely operate on the rollers 23 and 29, and in contact with the rollers 35, while the operating means will permit the body to be held at any desired inclination with respect to its dumping position. The device is of simple construction, strong and durable, can be readily applied to motor trucks of modern type and can be maintained at a very low cost.

Having thus described the invention, what is claimed is:—

1. An attachment for motor trucks having the usual chassis and run-way rails thereon extending throughout the length thereof and horizontally disposed parallel to the sides of the chassis, comprising a truck body having bottom slotted tracks, rollers at the rear ends of the run-way rails engaged in said slotted tracks, drums rotatably mounted on the chassis adjacent to the seat end thereof, means for operating the drums, a pair of booms pivoted at the axis of the drums and operable outwardly of the sides of the body, and connections between the forward end of the body and the drums whereby the body may be moved on its pivots to a dumping or carrying position and held at any desired inclination.

2. An attachment for motor trucks having the usual chassis and run-way rails thereon extending throughout the length thereof and horizontally disposed parallel to the sides of the chassis, comprising a truck body having bottom slotted tracks, rollers at the rear ends of the runway rails engaged in said slotted tracks, drums rotatably mounted on the chassis adjacent to the seat end thereof, means for operating the drums, a pair of booms pivoted at the axis of the drums and operable outwardly of the sides of the body, said body having forward extensions, pulleys at the free ends of the booms, cables trained around said drums and pulleys having pivotal connection with said extensions, and stirrups mounted at the pivots and straddling the booms to movably support the same.

3. In a motor dump truck, the combination with a wheeled frame; of a power driven shaft on the frame, and a dump body pivotally and movably mounted at the rear end of the frame for movement to a carrying or dumping position, a pair of booms pivotally mounted at said shaft and movable in vertical arcuate paths at the out sides of the body, pulleys on the shaft, pulleys at the free ends of the booms, cables trained around the respective pulleys of each boom, a pivot at the forward end of the body and extending transversely thereof, connections between the cables and pivot, stirrups connected to the pivot and straddling the booms, and rollers carried by the stirrups and movably supporting the booms, rotation of said shaft causing movement of the cables to swing the body into a dumping or carrying position, said stirrups moving along the beams.

In testimony that I claim the foregoing as my own, I have hereto affixed my signature in the presence of two witnesses.

ROBERT A. FONTAINE.

Witnesses:
BESSIE STUTZ,
LUCY TURNER.